(12) United States Patent
Opalka et al.

(10) Patent No.: US 10,632,584 B2
(45) Date of Patent: Apr. 28, 2020

(54) CRYOGENIC MACHINING PROCESS USING NANOFLUID

(71) Applicant: United Technologies Corporation, Farmington, CT (US)

(72) Inventors: Susanne M. Opalka, Glastonbury, CT (US); Tahany Ibrahim El-Wardany, Bloomfield, CT (US); Krzysztof Barnat, Berlin, CT (US); Ray-Sing Lin, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 166 days.

(21) Appl. No.: 15/483,115

(22) Filed: Apr. 10, 2017

(65) Prior Publication Data

US 2018/0290254 A1 Oct. 11, 2018

(51) Int. Cl.
*B23Q 11/10* (2006.01)
*C10M 171/06* (2006.01)
(Continued)

(52) U.S. Cl.
CPC ...... *B23Q 11/1061* (2013.01); *B23Q 11/1053* (2013.01); *C10M 125/00* (2013.01); *C10M 125/02* (2013.01); *C10M 125/04* (2013.01); *C10M 125/08* (2013.01); *C10M 125/18* (2013.01); *C10M 125/20* (2013.01); *C10M 125/22* (2013.01); *C10M 125/26* (2013.01); *C10M 171/06* (2013.01); *B23C 2250/12* (2013.01); *B23Q 11/126* (2013.01);
(Continued)

(58) Field of Classification Search
CPC . B23Q 11/126; B23Q 11/1053; B23Q 11/141; B23Q 11/146; B23Q 11/14; B23C 2250/12; C10N 2040/22; C10N 2220/082; C10M 171/06
See application file for complete search history.

(56) References Cited

U.S. PATENT DOCUMENTS 5,901,623 A * 5/1999 Hong .................. B23B 27/10
407/100
7,348,298 B2 * 3/2008 Zhang .................. B82Y 30/00
508/113
(Continued)

FOREIGN PATENT DOCUMENTS

WO  2006065869  6/2006
WO  2007044923  4/2007

OTHER PUBLICATIONS

European Search Report for European Patent Application No. 18166410 completed Aug. 29, 2018.

*Primary Examiner* — Christopher J Besler
(74) *Attorney, Agent, or Firm* — Carlson, Gaskey & Olds, P.C.

(57) ABSTRACT

A machining process includes providing a cutting tool having a rake face and a flank face; bringing the cutting tool into contact with a metal alloy work piece to form a chip by penetrating the cutting tool into the workpiece; and introducing a nanofluid into a vicinity of the penetration to remove heat and, in some instances, customize the finished surface. The nanofluid includes a mixture of a cryo-liquid and nanoparticles having a maximum size of approximately 0.1 nanometers to approximately 100 nanometers.

13 Claims, 2 Drawing Sheets

(51) Int. Cl.
*B23Q 11/12* (2006.01)
*C10N 40/22* (2006.01)
*C10M 125/08* (2006.01)
*C10M 125/04* (2006.01)
*C10M 125/20* (2006.01)
*C10M 125/26* (2006.01)
*C10M 125/18* (2006.01)
*C10M 125/02* (2006.01)
*C10M 125/22* (2006.01)
*C10M 125/00* (2006.01)

(52) U.S. Cl.
CPC ... *C10M 2201/041* (2013.01); *C10M 2201/06* (2013.01); *C10M 2201/061* (2013.01); *C10M 2201/065* (2013.01); *C10M 2201/081* (2013.01); *C10M 2201/087* (2013.01); *C10M 2201/102* (2013.01); *C10M 2201/105* (2013.01); *C10N 2040/22* (2013.01); *C10N 2220/082* (2013.01); *C10N 2240/40* (2013.01); *C10N 2240/401* (2013.01)

(56) References Cited

U.S. PATENT DOCUMENTS

| | | | |
|---|---|---|---|
| 7,389,941 B2 * | 6/2008 | Jackson | B05B 5/03 134/7 |
| 7,871,533 B1 * | 1/2011 | Haiping | B82Y 30/00 252/402 |
| 8,839,497 B2 | 9/2014 | Shin | |
| 8,926,858 B2 | 1/2015 | Jackson | |
| 2007/0114488 A1 * | 5/2007 | Jackson | B23Q 11/1053 252/71 |
| 2007/0215253 A1 | 9/2007 | Dasch et al. | |

\* cited by examiner

CRYOGENIC MACHINING PROCESS USING NANOFLUID

BACKGROUND

Oil-based or oil emulsion cutting fluids have been used for machining and deformation processing of metals and other materials. These fluids serve to reduce friction and wear, to remove heat, and to flush out generated debris. The removal of heat from the cutting tool prevents ductile deformation from thermal softening and fatigue failure from repeated thermal stresses. The removal of heat from the workpiece surface enhances the surface integrity by eliminating/reducing the occurrence of microstructure bends, white etch layers, phase transformations, changes in composition, or work hardening from excessive plastic deformation. Controlling the heat generated during machining will also prevent surface cracks and will increase the probability of inducing preferred compressive residual stresses at the surface.

The removal of heat is critical for metals with low thermal conductivity such as titanium, and also for metals that are difficult to machine, such as some stainless steels, nickel superalloys, and titanium. Usually different cooling methods are used to deliver the coolant in the vicinity of cutting where the chips, tool edge, and workpiece are in contact. Unfortunately, even with the use of high pressure coolant it is still a challenge to be able to reduce the heat generated during cutting, especially in the close vicinity of the cut. To increase the cutting speed and tool life (in order to increase productivity and reduce cost) it is recommended to apply more than just the flood coolant in the cutting zone.

More recently, cryogenic machining using liquid nitrogen or carbon dioxide as the cutting fluid has been used to improve heat removal (i.e., cooling via a large temperature differential). Cryogenic machining dramatically increases carbide tool life and enables higher cutting speeds. Cryogenic liquids do not appear to provide significant lubricity. A graphite or $MoS_2$ dry lubricant aerosol can also be co-fed to prevent tool attritious wear, but can lead to the possible generation of micro-level defects due to welding of small particulates on the finished surface. In addition, certain tool-workpiece material couples do not machine well under the "dry" cryogenic conditions. For example, the benefits for using cryogenic coolants have not been found to be significant for machining nickel-based materials.

SUMMARY

A machining process according to an example of the present disclosure includes providing a cutting tool that has a rake face and a flank face, bringing the cutting tool into contact with a metal alloy work piece to form a chip by penetrating the cutting tool into the workpiece, and introducing a nanofluid into a vicinity of the penetration to remove heat. The nanofluid includes a mixture of a cryo-liquid and nanoparticles that have a maximum size of approximately 0.1 nanometers to approximately 100 nanometers.

In a further embodiment of any of the foregoing embodiments, the nanofluid contains, by weight, up to 10% of the nanoparticles.

In a further embodiment of any of the foregoing embodiments, the nanofluid contains, by weight, from approximately 0.1% to approximately 2% of the nanoparticles.

In a further embodiment of any of the foregoing embodiments, the nanoparticles are selected from the group consisting of metal carbides, metal nitrides, hexagonal form of boron nitride, metal borides, and combinations thereof.

In a further embodiment of any of the foregoing embodiments, the nanoparticles are selected from the group consisting of carbon allotropes.

In a further embodiment of any of the foregoing embodiments, the nanoparticles are metals selected from the group consisting of silver, indium, copper, tin, and combinations thereof.

In a further embodiment of any of the foregoing embodiments, the nanoparticles are selected from the group consisting of metal sulfides, metal borates, and combinations thereof.

In a further embodiment of any of the foregoing embodiments, the nanoparticles are selected from the group consisting of metal silicates, metal fluorides, and combinations thereof.

In a further embodiment of any of the foregoing embodiments, the nanofluid includes a surfactant agent coupled to surfaces of the nanoparticles. The surfactant agent is selected from the group consisting of amphiphilic compounds that contain a polar functional group and a heteroatom, and the surfactant agent has an atomic backbone that is from 15 to 30 atoms in length.

In a further embodiment of any of the foregoing embodiments, the nanoparticles are solid in the cryo-liquid and are non-solid at 20° C. and an absolute pressure of 1 atm.

A further embodiment of any of the foregoing embodiments include using the nanoparticles of the nanofluid that reacts to form a functional protective coating on at least one of cutting tool or the workpiece.

In a further embodiment of any of the foregoing embodiments, the nanofluid is introduced into the vicinity of the penetration externally of the cutting by directing the nanofluid toward the rake face, the flank face, or both the rake face and the flank face.

In a further embodiment of any of the foregoing embodiments, the nanofluid is introduced into the vicinity of the penetration internally to the cutting by circulating the nanofluid within the cutting tool.

A fluid for aiding in a machining process according to an example of the present disclosure includes nanofluid that has a mixture of a cryo-liquid and nanoparticles that have a maximum size of approximately 0.1 nanometers to approximately 100 nanometers.

In a further embodiment of any of the foregoing embodiments, the nanofluid contains, by weight, up to 10% of the nanoparticles.

In a further embodiment of any of the foregoing embodiments, the nanofluid contains, by weight, from approximately 0.1% to approximately 2% of the nanoparticles.

In a further embodiment of any of the foregoing embodiments, the nanoparticles are selected from the group consisting of metal carbides, metal nitrides, metal borides, carbon allotropes, metal sulfides, metal borates, metal fluorides, and combinations thereof.

In a further embodiment of any of the foregoing embodiments, the nanoparticles are metals selected from the group consisting of silver, indium, copper, tin, and combinations thereof.

In a further embodiment of any of the foregoing embodiments, the nanofluid includes a surfactant agent coupled to surfaces of the nanoparticles. The surfactant agent is selected from the group consisting of amphiphilic compounds that contain a polar functional group and a heteroatom, and the surfactant agent has an atomic backbone that is from 15 to 30 atoms in length.

In a further embodiment of any of the foregoing embodiments, the nanoparticles are solid in the cryo-liquid and are non-solid at 20° C. and an absolute pressure of 1 atm.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
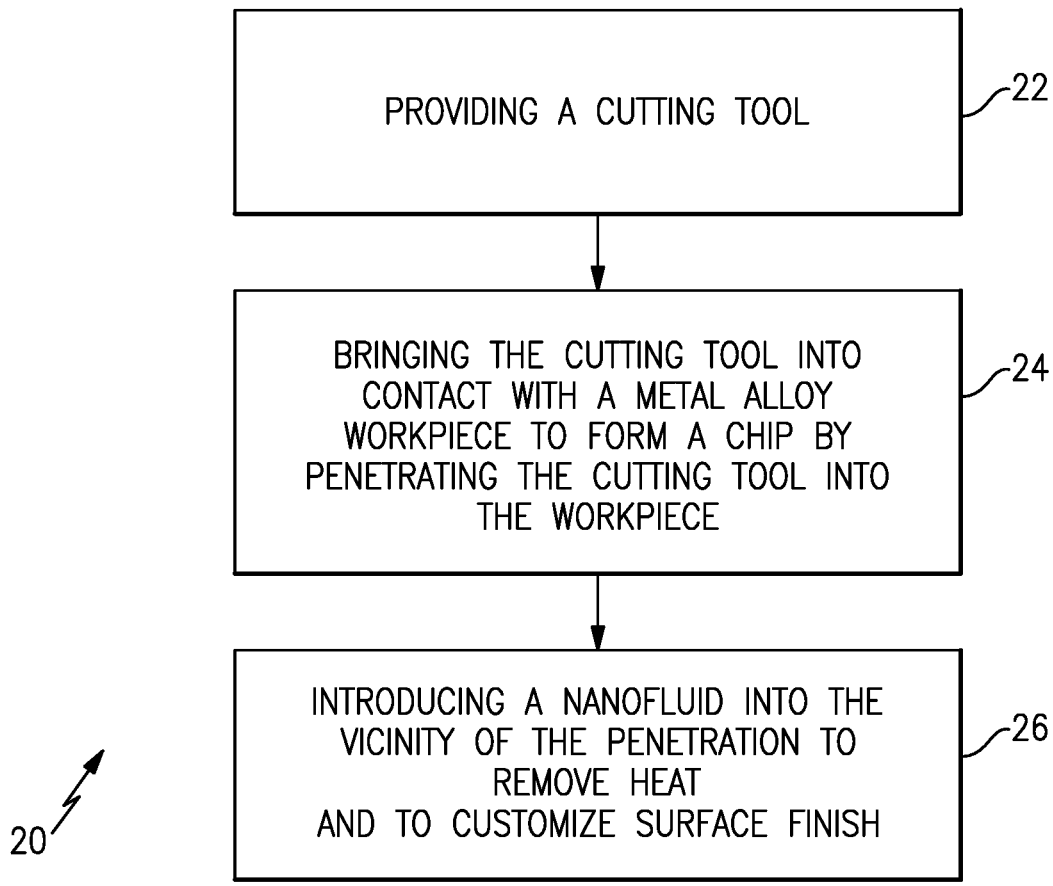
FIG. 1 illustrates an example process for machining.
Figure 2A:
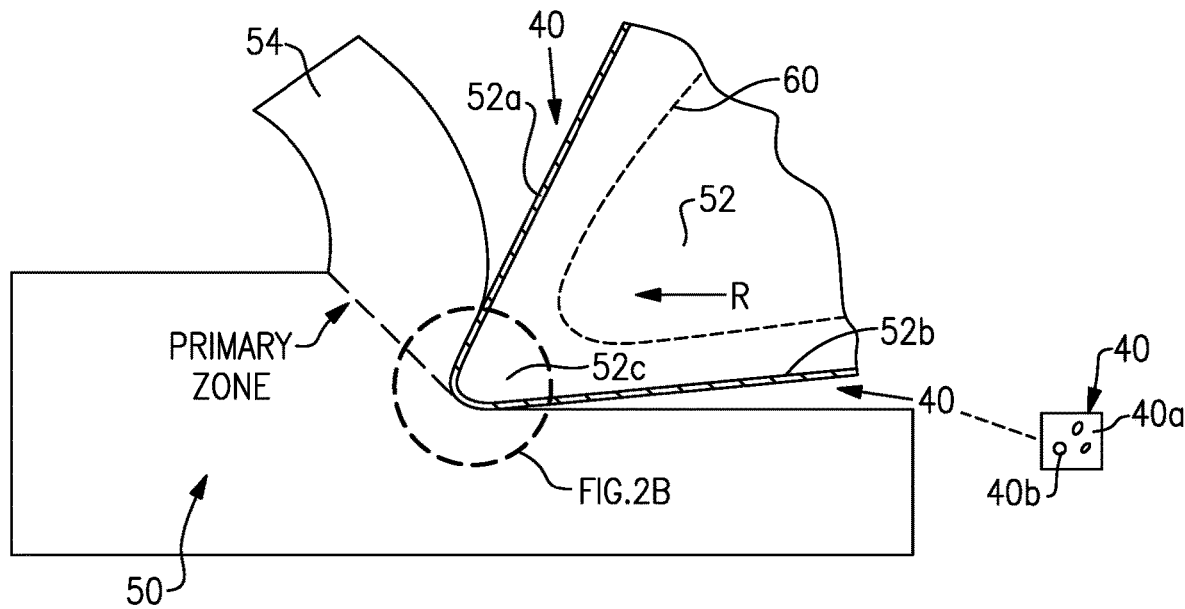
FIG. 2A illustrates an example tool-metal alloy workpiece cross-section during the process of FIG. 1.
Figure 2B:
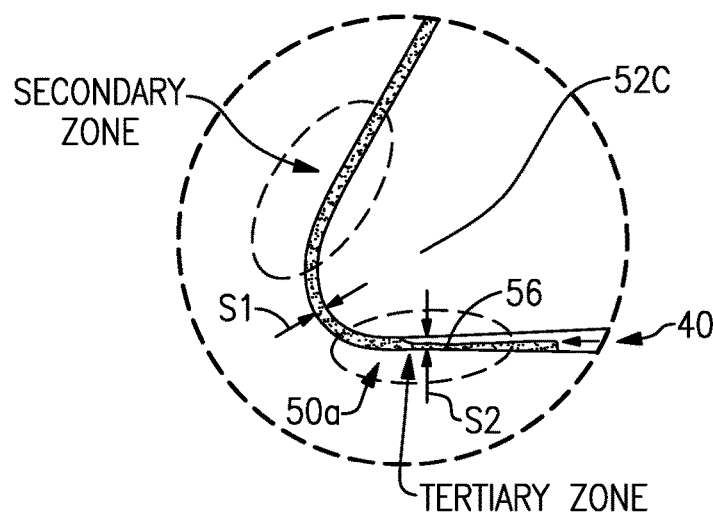
FIG. 2B illustrates a magnified view in the vicinity of a cutting tip of a tool in FIG. 2A.

FIG. 1 illustrates a machining process flow diagram 20, and FIGS. 2A and 2B illustrate a tool-metal alloy workpiece cross-section 50 during the process 20. As will be described, the process 20 utilizes a nanofluid 40 to, among other purposes, remove heat from the vicinity of cut. In general, referring to both FIGS. 1 and 2, the process 20 includes the provision of a cutting tool 52 at step 22, bringing the cutting tool 52 into contact with the workpiece 50 at step 24, and introducing the nanofluid 40 into the vicinity of the cutting to remove heat and to customize surface finish at step 26.

As shown in FIGS. 2A and 2B, the cutting tool 52 includes a rake face 52a and a flank face 52b that meet at a cutting tip 52c. The rake face 52a is the leading edge surface of the tool 52 that initially contacts the chips 54. The flank face 52b is the adjacent trailing edge surface. During the process 20, the cutting tip 52c penetrates into the workpiece 50 to form a chip 54. In this regard, either the workpiece 50, the cutting tool 52, or both may be moving or rotating (relative to each other) to produce the penetration. In the example shown, the relative movement of the cutting tool 52 is represented at arrow R.

As is generally known for cutting processes, this type of cutting produces a primary deformation (shear) zone ahead of the chip 54, a secondary deformation (shear) zone at the rake face of the tool and the back surface of the chip 54, and a tertiary deformation zone in a new surface 50a behind the tool clearance flank face 52b. Most typically, the primary deformation zone is in elasto-plastic deformation, the secondary deformation zone is in plastic deformation, and the tertiary deformation zone is in elastic deformation. Each deformation produces heat which, if not adequately removed, may result in undesired phase transformations, work hardening, and surface roughening of the workpiece 50 and ductile deformation and thermal fatigue of the cutting tool leading to tool wear 52, all due to large uneven temperature distributions. The heat generation and removal can be controlled to some extent by limiting cutting speed; however, the use of the nanofluid 40 removes heat and may facilitate enhancement for a wider range of tool or workpiece materials and/or a wider range of machining conditions, such as more aggressive cutting parameters or higher cutting rates, as well as enabling longer tool life.

The nanofluid 40 includes a base carrier fluid. The base carrier fluid is a cryo-liquid (represented at 40a), such as liquid nitrogen, liquid carbon dioxide, liquid argon, liquid helium, or mixtures thereof. The cryo-liquid 40a is mixed with nanoparticles (represented at 40b) that have a maximum size of approximately 0.1 nanometers to approximately 100 nanometers. Most typically, the nanoparticles 40b will be less than or equal to 20 nanometers in size, to enhance dispersion by Brownian motion. The mixture (dispersion) can be prepared by physical mixing, for example by using an ultrasonic transducer. The nanoparticle 40b composition and size can be selected to minimize the dispersion Péclet number and settling according to Stoke's Law, in order to optimize cryogenic dispersion stability via Brownian motion.

The nanoparticles 40b may be selected from metal carbides, metal nitrides including the hexagonal form of boron nitride, metal borides, and their mixed phases; lamellar compounds, such as but not limited to metal (e.g., Zn, W, Mo) sulfides and borates; alkali (e.g., Na, K) or alkaline earth (e.g., Mg) silicates and their hydroxides (e.g., talc); carbon allotropes, such as but not limited to graphene (oxide), ultradispersed nano-crystalline diamond, DLC, graphite, spheroidal carbons, including fullerenes and carbon nanorods; silver or other soft metals with low vapor pressures (e.g., indium, copper, tin); and fluorides such as but not limited to calcium fluoride and rare earth fluorides (e.g., $CeF_3$). Most typically, the nanoparticles 40b will be spherical, ellipsoidal, or tube/rod in shape.

The composition of the nanoparticles 40b can be selected in cooperation with the type of metal alloy of the workpiece 50 and/or the composition of the cutting tool 52. For example, the metal alloy of the workpiece 50 is iron, steel, hardened steel, nickel alloy, or titanium alloy. The cutting tool 52 may be formed of a carbide tool, tool steel, tungsten carbides, nitrides, borides, or their mixed phases (e.g., cubic boron nitride, cermets, such as ceramic/metal composites, or polycrystalline diamond). The tool can be uncoated, or coated with TiN, TiCN, TiAlN, AlTiN, AlCrN, diamond-like carbon (DLC), or molybdenum disulphide ($MoS_2$), for example. As will be appreciated, the surfaces of the workpiece 50 and the cutting tool 52 may also be passivated with native oxides that are polar or hydrophilic in character. For titanium alloy it is always preferable to use uncoated carbide tools. Here, metal carbide nanoparticles may be used in the nanofluid to chemically interact with the freshly generated surface on the workpiece, in order to supplant detrimental workpiece reactions with the carbide tool surface. However, for hardened steel workpieces, ceramic based and CBN tools are more recommended. Nanofluids with metal boride or metal carbide nanoparticles are compatible with these couples, and may interact to provide further strengthening of the steel surface and prevent tool wear. Thus, using nanofluid for cooling the vicinity of cutting can improve the performance of specific tool-workpiece configurations and further provide enhancement of surface properties.

The nanofluid may be introduced into the vicinity of the penetration of the cutting tool 52 into the workpiece 50 by external introduction, internal introduction, or both. The terms "external" and "internal" refer to the nanofluid 40 being introduced, respectively, external to or internal to the cutting tool 52. In external introduction, the nanofluid 40 is introduced by, for example, using a specially designed nozzle for spraying the nanofluid 40 toward the cutting tip 52c. For instance, the nanofluid 40 can be sprayed ahead of the cutting tool 52 adjacent to the rake face 52a, sprayed along the flank face 52b, or both. Most typically, the nanofluid 40 will be sprayed using one or more nozzles, similar to nozzles that are already known for spraying pure cryogenic or non-cryogenic fluids. In internal introduction, the nanofluid 40 is circulated through a passage (represented at 60) in the cutting tool 52. In this case, the nanofluid 40 may not contact the actual cutting interface with the workpiece 50. However, the nanofluid 40 could additionally be externally introduced or be discharged from the passage 60 external to the cutting tool 52 directly into the cutting interface.

The nanofluid 40 includes, by weight, up to 10% of the nanoparticles 40b. Most typically, the nanofluid 40 will include, by weight, from approximately 0.1% to approximately 2% of the nanoparticles 40b. In further examples, the nanofluid 40 may include only the cryo-liquid 40a and the nanoparticles 40b. As used herein, the term "approximately" refers measuring error in the next significant digit (e.g., for 0.1, error in the hundredths decimal).

The nanofluid 40 may further include a surfactant agent (coupling agent) to facilitate dispersion in the cryo-liquid 40a. For instance, the nanoparticle 40b concentration in the nanofluid 40, morphology, aspect ratio, and surface functionality (modified, if necessary, with surfactants or coupling agents) are optimized to prevent their aggregation, and also to tailor nanofluid-surface interactions for the workpiece contact topology. For example, the surfactant agent is an amphiphilic compound that contains a polar functional group with one or more heteroatoms (besides carbon or hydrogen) at the end of long molecular tails (often called boundary additives in lubricant formulations). The endgroups can either physisorb (weak, associative bonding) or chemisorb (strong, covalent or ionic bonding) on the surfaces of the nanoparticles 40b. The strength of the bonding interaction depends on the endgroup, and the difference in the acid-base character of the endgroup and the nanoparticle surface. Most typically, the surfactant is selected in accordance with the chemistry of the nanoparticles 40b such that the bonding interactions are reversible, to enable their desorption and readsorption on mechanical contact surfaces at higher temperatures. Example endgroups may include, but are not limited to, anionic groups (polar functional groups, negatively charged), such as carboxylates (e.g., including fatty acids), sulfates, sulphonates, phosphates, phosphonates, and phosphites; nonionic groups (polar functional groups that have non-bonding electron pairs), such as alcohols, alcohol ethers, ethers, and esters; and cationic groups (polar functional group positively charged), such as amines.

In further examples, the endgroups have molecular tails to enhance nanoparticle dispersion by steric stabilization. For examples, the molecular tails have atomic backbones that are 15-30 atoms in length, to enable their extension and flexibility in solution with minimum entanglement. The backbones can be formed from, for example, hydrocarbons (including alkyl, straight, or branched saturated; olefinic or unsaturated; or aromatic), fluorocarbons, or siloxanes.

In another example, the nanoparticles 40b are frozen in the cryo-liquid 40a but are non-solid at 20° C. and an absolute pressure of 1 atm. For example, the nanoparticles 40b are frozen particles formed by freezing droplets of ambient temperature liquids (e.g., low molecular weight, alcohols, glycols, fatty acids, hydrocarbons). In addition to serving the functions described above, the frozen nanoparticles 40b may serve to polish the surface of the workpiece 50 upon melting. In addition, trapped gas bubbles (e.g., air, helium, argon) may be injected into the cryo-liquid 40a and used to tailor surface finish by cavitation effects.

The nanoparticles 40b serve to enhance the performance of the nanofluid 40 in the process 20. For example, although the large temperature differential of the cryo-liquid 40a is effective for removing heat, the nanoparticles 40b further enhance heat removal by i) enabling infiltration into the chip-tool interface where the highest temperatures are generated, ii) providing increased nanofluid thermal conductivity compared to the base cryo-liquid, iii) providing nanoconvection effects from the nanoparticles 40b, and iv) enhancing wetting of the nanoparticle-entrained cryo-liquid into the cutting region to locally reduce thermal gradients.

The nanoparticles 40b also reduce friction in the cutting region. This is achieved by increasing the capacity for a hydrodynamic film of the nanofluid 40 to maintain a separation (designated at "S1") and bear loads without collapsing, thereby reducing the coefficient of friction, reducing heat generation, reducing grinding forces, reducing ratio of workpiece removal-tool wear, enhancing chip ejection, and improving surface finish. As an example, the nanofluid can maintain a separation S1 of less than approximately 0.1 micrometers at the cutting tip 52c. In this regard, the nanofluid 40 can be used on selected surfaces of a component, such as a nickel component, to tailor the quality of the surface finish of those surfaces to make the surfaces smoother or rougher or harder or softer. Reductions in the coefficient of friction may lead to a reduction in the radial forces which will improve tool life, surface integrity and reduced workpiece deformation. The use of the nanofluid 40 may also increase productivity by at least a factor of two due to the increase in cutting speed (nanofluid reductions in the interfacial temperature allow for increasing the speed by a factor of two, in addition to increases in feed rate). By developing a specially designed nozzle, it is possible to utilize multiple types of nanoparticle materials, and vary their sizes and distributions. The correct material and size can be released during machining at different rates and configurations based on the design requirements for the functionally graded surface.

The nanoparticles 40b can further be used to form a coating on the workpiece 50 and/or cutting tool 52. For example, the nanoparticles 40b may be reactive under high loads due to their high surface per unit weight compared to larger macroparticles, which controls their stability and reactivity. The surfaces of the nanoparticles 40b, particularly those containing sulfur or boron, may have unsaturated chemical valences, which may drive reactions under high loads. In particular, such high loads can be deliberately created in the vicinity of the tertiary zone, where there may be a separation of less than approximately 0.05 micrometers (designated at "S2") between the cutting tool 52 and newly exposed surface of the workpiece 50 (designated at 56). In this way, they may function like lubricant extreme pressure/anti-wear additives, which typically contain sulfur, phosphorus, or chlorine, that react with the newly created surface 56 to form protective coatings to prevent tool-workpiece contact under high loads and/or high temperatures. Contact loads can increase up to the load equivalent of the workpiece hardness. Under such high contact loads, the nanoparticles 40b may deform and "stick" or adhere to the newly created surface 56 of the workpiece 50 and/or cutting tool 52, where they react with each other to form a localized and very thin coating layer that may serve to protect or heal surface defects in the underlying workpiece 50 or cutting tool 52. The nanofluid particles can be added deliberately efficiently and effectively generate functionally graded surface condition for certain design requirements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A machining process comprising:
providing a cutting tool having a rake face and a flank face;
bringing the cutting tool into contact with a metal alloy work piece to form a chip by penetrating the cutting tool into the workpiece; and
introducing a nanofluid into a vicinity of the penetration to remove heat, the nanofluid including a mixture of:
a cryo-liquid, and
nanoparticles having a maximum size of approximately 0.1 nanometers to approximately 100 nanometers, wherein the nanoparticles are selected from the group consisting of metal carbides, metal nitrides, hexagonal form of boron nitride, metal borides, and combinations thereof.

2. The machining process as recited in claim 1, wherein the nanofluid contains, by weight, up to 10% of the nanoparticles.

3. The machining process as recited in claim 2, wherein the nanofluid contains, by weight, from approximately 0.1% to approximately 2% of the nanoparticles.

4. The machining process as recited in claim 1, wherein the nanofluid includes a surfactant agent coupled to surfaces of the nanoparticles, the surfactant agent is selected from the group consisting of amphiphilic compounds that contain a polar functional group and a heteroatom, and the surfactant agent has an atomic backbone that is from 15 to 30 atoms in length.

5. The machining process as recited in claim 1, including using the nanoparticles of the nanofluid that reacts to form a functional protective coating on at least one of cutting tool or the workpiece.

6. The machining process as recited in claim 1, wherein the nanofluid is introduced into the vicinity of the penetration externally of the cutting by directing the nanofluid toward the rake face, the flank face, or both the rake face and the flank face.

7. The machining process as recited in claim 1, wherein the nanofluid is introduced into the vicinity of the penetration internally to the cutting by circulating the nanofluid within the cutting tool.

8. The machining process as recited in claim 1, wherein the nanoparticles are selected from the group consisting of the metal carbides, metal nitrites, metal borides, and combinations thereof.

9. The machining process as recited in claim 8, wherein the nanofluid contains, by weight, from approximately 0.1% to approximately 2% of the nanoparticles.

10. The machining process as recited in claim 1, wherein the nanoparticles are selected from the group consisting of the metal carbides.

11. The machining process as recited in claim 1, wherein the nanoparticles are selected from the group consisting of the metal nitrides.

12. The machining process as recited in claim 1, wherein the nanoparticles are selected from the group consisting of the metal borides.

13. The machining process as recited in claim 1, wherein the nanofluid consists of the cryo-liquid and the nanoparticles are selected from the group consisting of the metal carbides, metal nitrites, metal borides, and combinations thereof.

* * * * *